(12) United States Patent
Bracken et al.

(10) Patent No.: US 6,491,255 B1
(45) Date of Patent: Dec. 10, 2002

(54) CRASHWORTHY EXTERNAL AUXILIARY FUEL TANK FOR AIRCRAFT

(76) Inventors: Jeff Bracken, 944 N. Owl Dr., Higley, AZ (US) 85236; Randy Crane, 35 Shaggy Mountain Dr., Merriman, UT (US) 84065; Bill York, 8115 E. Edgemont, Scottsdale, AZ (US) 85257

( * ) Notice: Subject to any disclaimer, the term of this patent is extended or adjusted under 35 U.S.C. 154(b) by 12 days.

(21) Appl. No.: 09/738,125

(22) Filed: Dec. 15, 2000

(51) Int. Cl.[7] .............................................. B64D 37/04
(52) U.S. Cl. .................... 244/135 R; 220/564; 220/4.15
(58) Field of Search ......................... 244/135 B, 135 R; 220/4.15, 4.12, 4.16, 4.01, 4.17, 564, 562, 4.08, 4.09

(56) References Cited

U.S. PATENT DOCUMENTS 2,355,084 A * 8/1944 Kurrle
2,952,427 A * 9/1960 Armstrong
2,953,156 A * 9/1960 Bryant
3,042,060 A * 7/1962 Lindemann
3,323,534 A * 6/1967 Johnson et al.
4,259,022 A * 3/1981 Folland
4,511,105 A * 4/1985 Morrisey
4,790,350 A * 12/1988 Arnold
5,467,889 A * 11/1995 Ashton et al.

* cited by examiner

*Primary Examiner*—Charles T. Jordan
*Assistant Examiner*—T. Dinh
(74) *Attorney, Agent, or Firm*—Parsons & Goltry; Robert A. Parsons; Michael W. Goltry (57) ABSTRACT

An external auxiliary fuel tank for aircraft including a crashworthy bladder carried within an elongated shell. A center structure is carried by the shell intermediate opposing ends thereof, through which the bladder passes. A mounting assembly is carried by the center structure for attaching the fuel tank to an aircraft.

27 Claims, 12 Drawing Sheets

CRASHWORTHY EXTERNAL AUXILIARY FUEL TANK FOR AIRCRAFT

FIELD OF THE INVENTION

This invention relates to aircraft fuel systems.

More particularly, the present invention relates to external auxiliary fuel tanks.

In a further and more specific aspect, the instant invention concerns crashworthy fuel tanks.

BACKGROUND OF THE INVENTION

Auxiliary fuel tanks have been used on aircraft for many years. Internal auxiliary fuel tanks have been developed to be safe and effective, employing crashworthy bladders. In other words, in a survivable crash for the occupants, the tank typically will not rupture and will not contribute to a post-crash fire that may injure or kill the occupants. External auxiliary fuel tanks are conventionally, simply fuel tight containers meeting the requirements of being aerodynamic in shape and securely attachable to the aircraft. Traditionally, crashworthiness has not been a significant consideration since external auxiliary fuel tanks are intended to be dropped or jettisoned before a dangerous situation, such as combat or impending crash.

In the situation of an impending crash of a low flying aircraft, particularly a helicopter, there is often insufficient time to jettison an external fuel tank. If a tank is jettisoned from low altitude, it may often impact close to the crash site. If the tank ruptures, the fuel may contribute to a post crash fire that may injure or kill the occupants. Needless to say, this occurrence is undesirable, as the survivability of the crash will be greatly reduced.

In the situation of combat or the possibility of being struck by bullets from common small arms or man-portable weapons ("small arms") fire, conventional external auxiliary fuel tanks will rupture and leak fuel. To avoid this situation, the tank is dropped prior to the occurrence or the risk of leakage is accepted.

It would be highly advantageous, therefore, to remedy the foregoing and other deficiencies inherent in the prior art.

Accordingly, it is an object of the present invention to provide a new and improved external auxiliary fuel tank.

Another object of the invention is to provide a crashworthy external auxiliary fuel tank.

And another object of the invention is to provide an external auxiliary fuel tank that will be self-sealing upon the impact of small arms fire.

SUMMARY OF THE INVENTION

Briefly, to achieve the desired objects of the instant invention in accordance with a preferred embodiment thereof, provided is an external auxiliary fuel tank for aircraft. The tank includes an elongated shell having a forward shell portion, a rearward shell portion, and an upper side. The forward shell portion and the rearward shell portion are joined by a center structure. The center structure, being generally tubular in shape, defining a central opening and having a longitudinal gap formed opposite an upper side thereof, joins the forward shell portion to the rearward shell portion at a midpoint. A crashworthy bladder having a first end, a second end, and an upper side, is carried within the shell and extends between the forward shell portion and the rearward shell portion through the central opening of the center structure with the upper side of the bladder adjacent the upper side of the shell. A mounting assembly is carried by an upper side of the center structure for attaching the fuel tank to an aircraft.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENT

Figure 1:
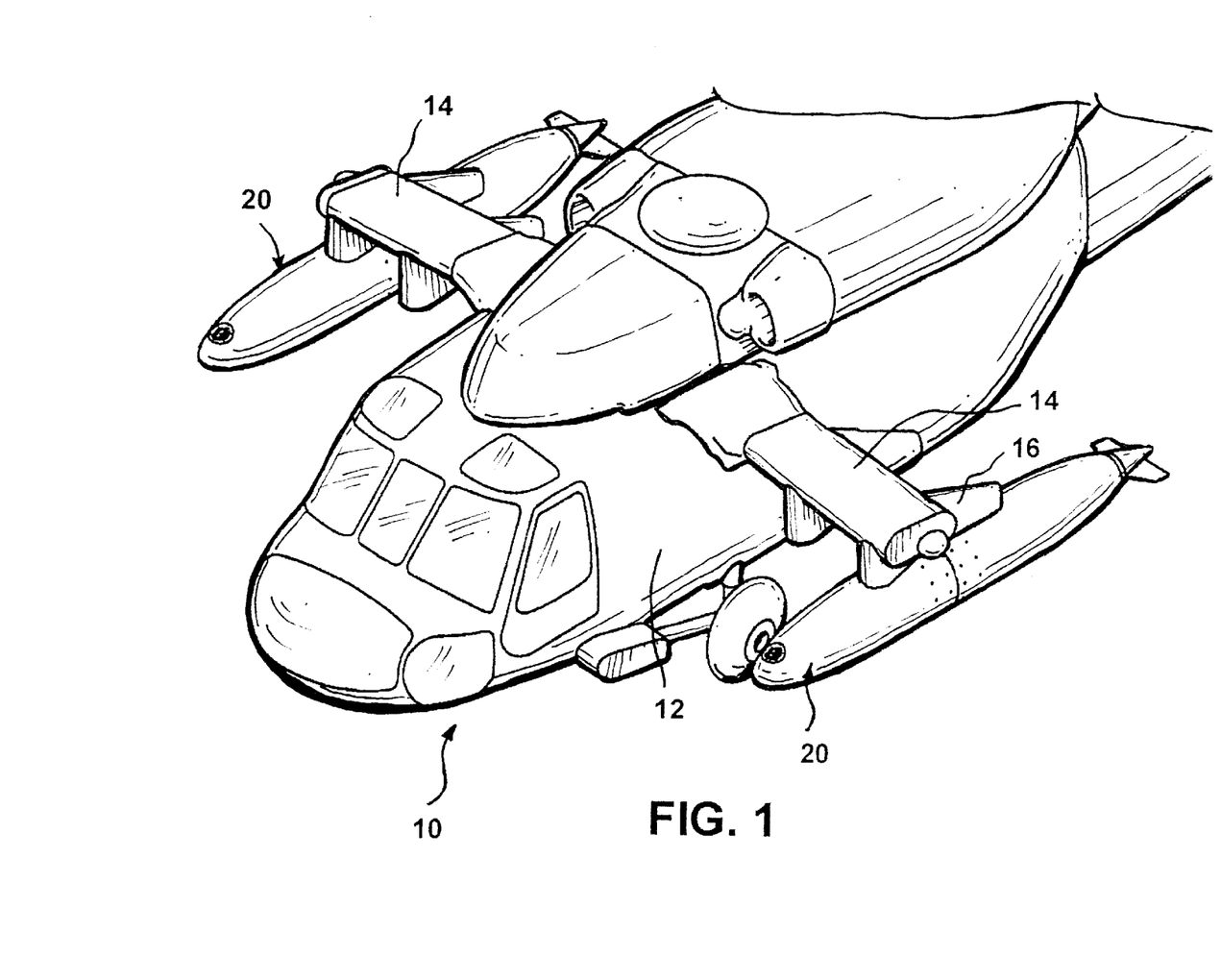
FIG. 1 is a partially perspective view of an aircraft carrying the external auxiliary fuel tank according to the present invention.

Turning now to the drawings in which like reference characters indicate corresponding elements throughout the several views, attention is first directed to FIG. 1 which illustrates a helicopter 10 having a fuselage 12 and wings 14 extending therefrom. Many helicopters have or can be fitted with wings to provide hard points for the attachment of munitions and external tanks or other stores. Wings 14 include pylons 16 depending therefrom, to which various items are attached. An external auxiliary fuel tank according to the present invention, generally designated 20, is coupled to pylons 16. While a helicopter is shown, specifically a UH-60 Blackhawk utility helicopter, one skilled in the art will understand that external auxiliary fuel tank 20 can be employed on other helicopters and other aircraft in general. It should also be noted that while one external auxiliary fuel tank 20 is fitted to each wing 14, multiple tanks can be attached, depending upon the aircraft.

Figure 2:
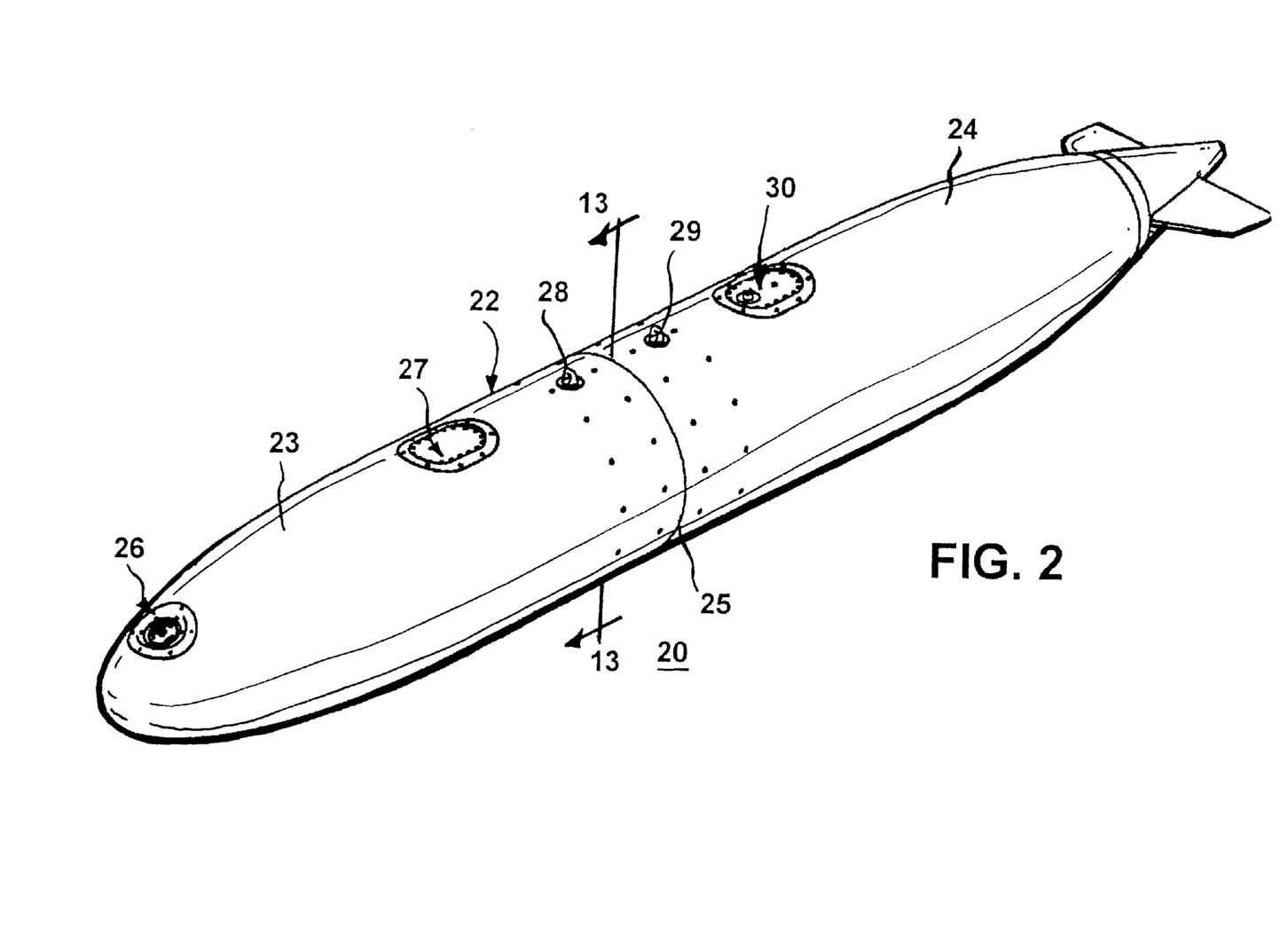
FIG. 2 is a perspective view of the external auxiliary fuel tank of FIG. 1.
Figure 3:
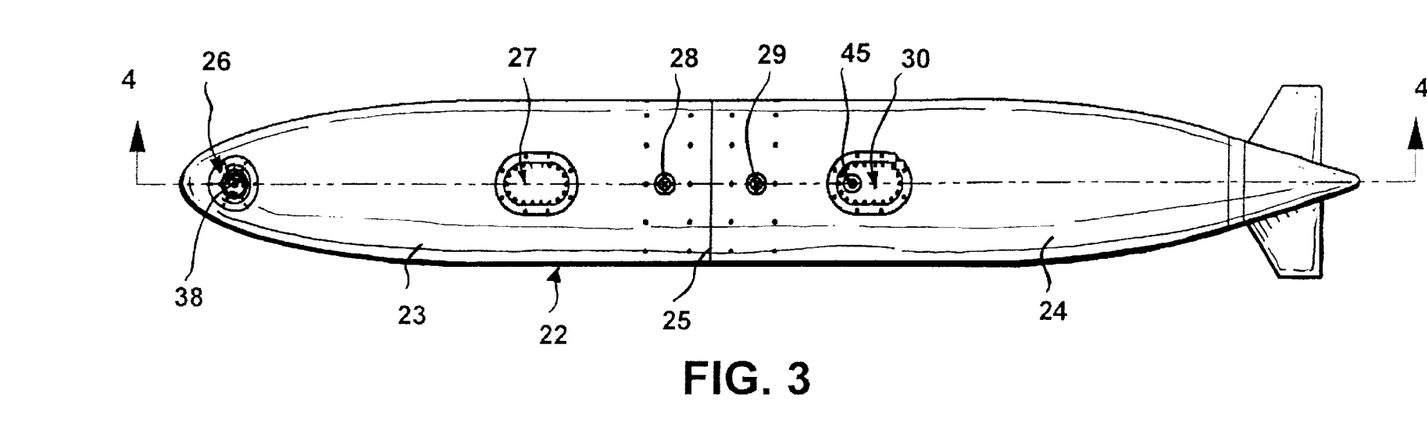
FIG. 3 is a top plan view of the external auxiliary fuel tank of FIG. 2.

Turning now to FIGS. 2 and 3, external auxiliary fuel tank 20 is illustrated. Tank 20 includes a generally aerodynamic or torpedo shaped shell 22 composed of a forward shell portion 23 and a rearward shell portion 24. Shell portions 23 and 24 abut at an approximate midline 25 of tank 20 and are joined by a plurality of screws to a center structure, not visible. In the present embodiment, portions 23 and 24 abut, but it will become evident to those skilled in the art from the continuing description, that in other embodiments portions 23 and 24 can be spaced apart, that space closed by an outer portion of the center structure. With additional reference to FIG. 15, shell 22 has a number of apertures for receiving structures having various purposes. Forward shell portion 23 receives a gravity fill port 26, a forward access cover 27, and a mounting lug 28. Rearward shell portion 24 receives a mounting lug 29, and a rearward access cover 30. Details of each structure will be described in the ensuing description. Shell 22 is preferably constructed of conventional lightweight but strong composite materials in a honeycomb configuration well known to those skilled in the art, and can be an existing external auxiliary fuel tank or a newly fabricated structure. In retrofitting an existing external auxiliary fuel tank, the tank is divided into what will become forward shell portion 23 and rearward shell portion 24. Shell 22 acts as a housing to support and streamline the components of the present invention.

Figure 4:
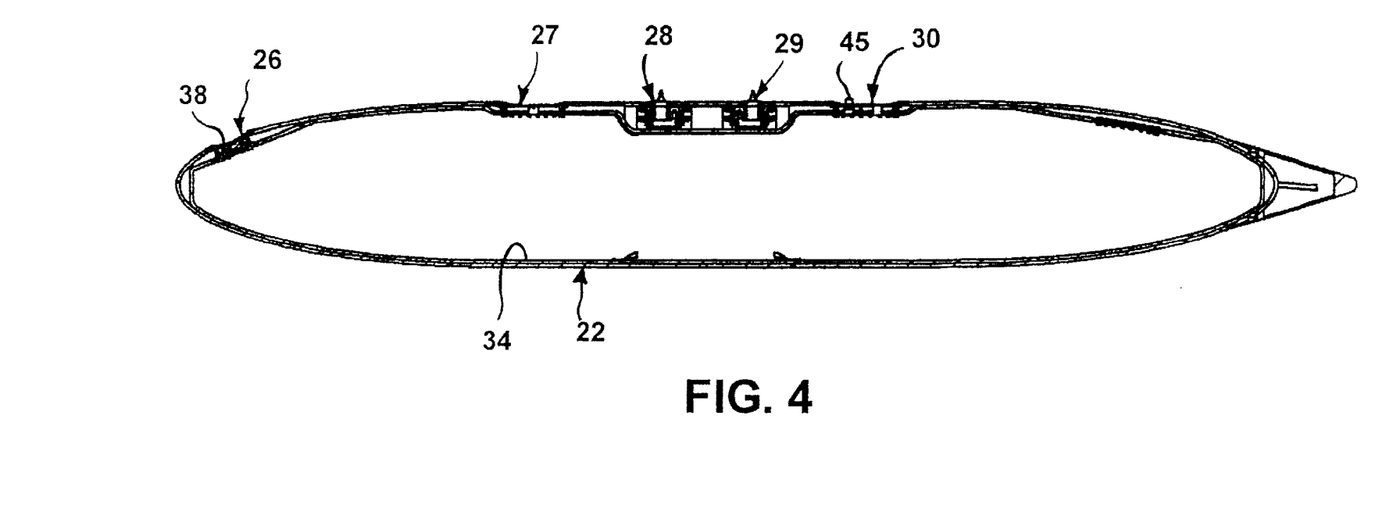
FIG. 4 is a sectional side view of the external auxiliary fuel tank of FIG. 3, taken along line 4—4.
Figure 5:
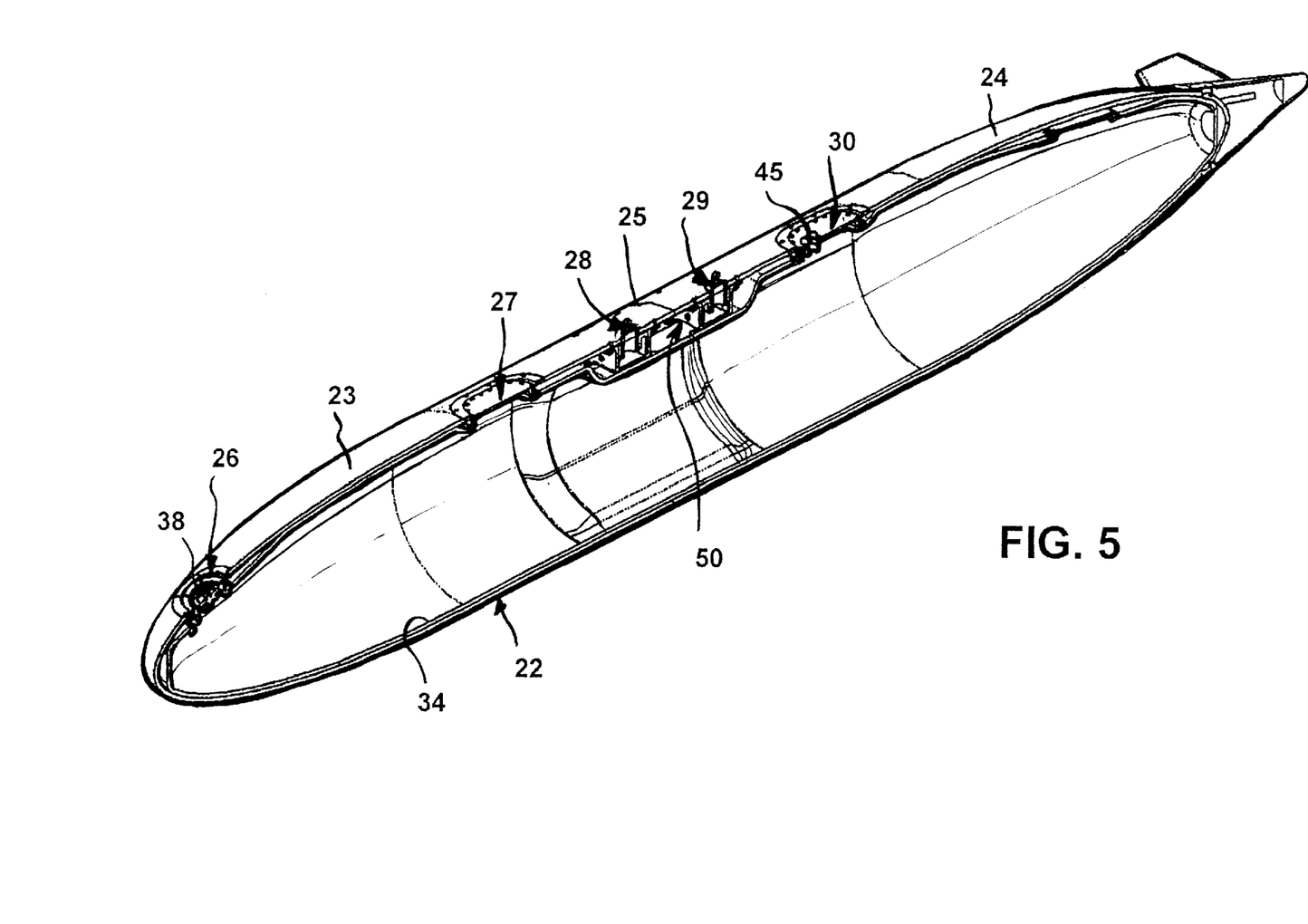
FIG. 5 is a sectional side view, in perspective, of the external auxiliary fuel tank of FIG. 4.

With additional reference to FIGS. 4 and 5, shell 22 encloses a single bladder 34 extending substantially the entire length of shell 22 and having a forward end and a rearward end corresponding to forward shell portion 23 and rearward shell portion 24, respectively. Gravity fill port 26 which can be mounted to either shell end. A fuel cap 38 closes the gravity fill port. Cap 38 can be removed or opened to allow fuel to be pumped into bladder 34 through gravity fill port 26. This is a method of filling external auxiliary fuel tank 20 directly.

Figure 6:
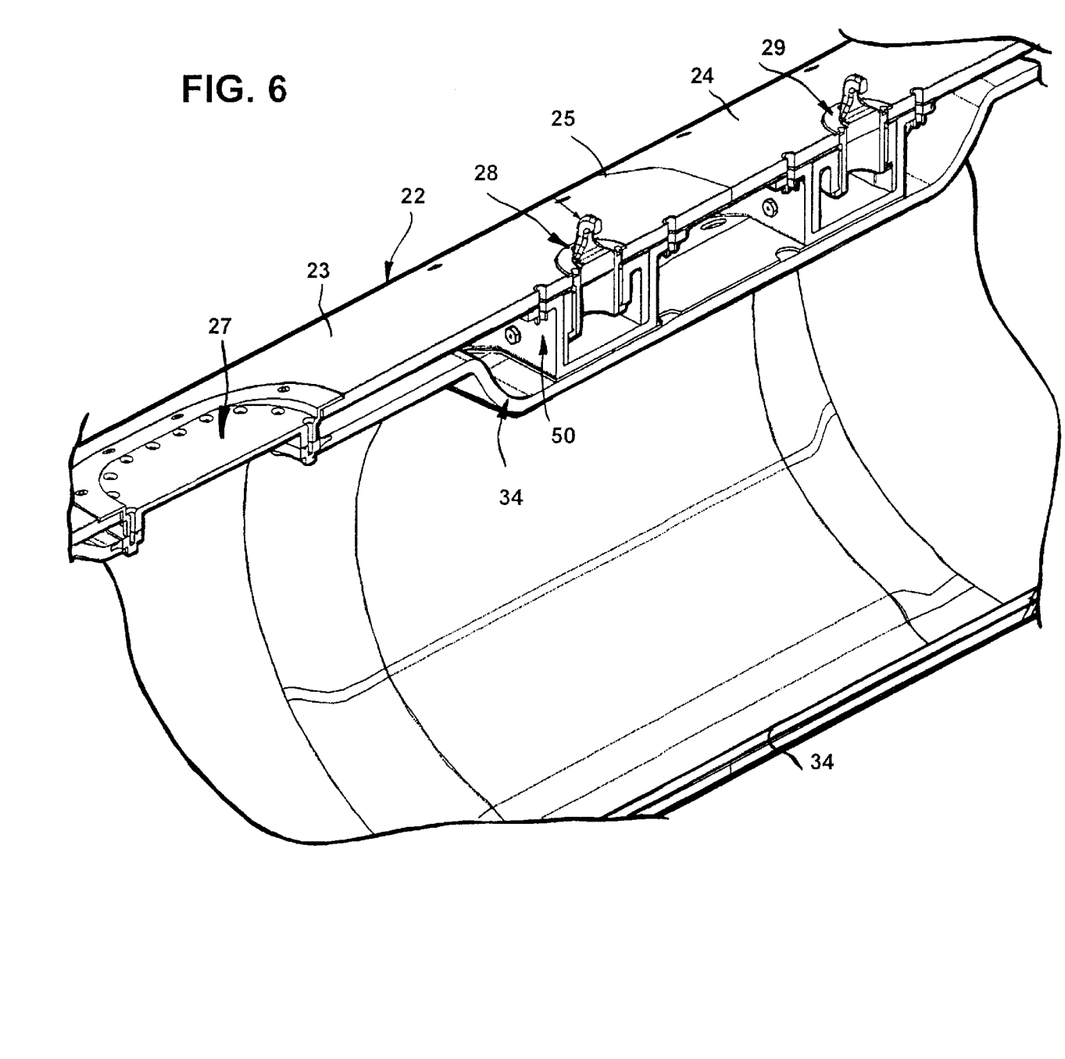
FIG. 6 is an enlargement of a central portion of FIG. 5.

Forward access cover 27 can carry many tank components including a roll over vent valve 39 and a high level pilot valve 40 or other components that allow the tank to be single-point pressure refueled simultaneously with the aircraft and that allow fuel gravity information to be provided to an aircraft display. Roll over vent valve 39 allows venting of gasses from bladder 34 when adding fuel, and venting gasses into bladder 34 when removing fuel. Vent valve 39 closes, preventing leakage of fuel if the tank should roll over or become inverted. Preventing spillage is accomplished by employing a conventional gravity operated check valve, although other technology can be used. High level pilot valve 40 can be positioned proximate the highest point of bladder 34. With momentary reference to FIG. 6, forward access cover 27 has an integral aperture in shell 22. Thus, for maintenance, cover 27 can be removed to access the interior of bladder 34, including all internal components. It will be understood that all openings in bladder 34 are well sealed to preventing leaks, and are able to withstand high pressures and stress.

Figure 15:
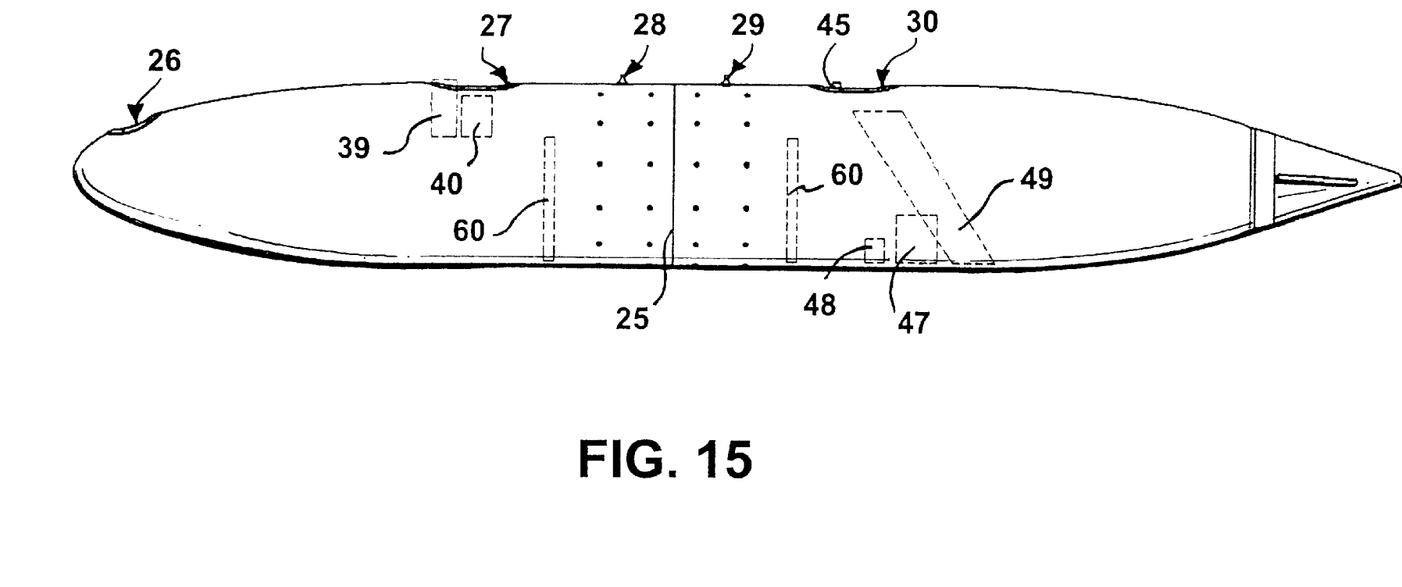
FIG. 15 is a side view of the external auxiliary fuel tank of FIG. 2 with schematic illustrations of the internal structures.

Returning to FIGS. 4 and 5 and still referring to FIG. 15, rearward access cover 30 can carry a fuel port 45 which can be coupled to a fuel/defuel valve 47 and can support other tank components such as a fuel quantity probe 49. Rearward access cover 30 is coupled to shell 22 and bladder 34 in a manner substantially similar to forward access cover 27, and therefore will not be further described. Fuel port 45 is preferably of the self-sealing pull-away type employed in single point pressure refueling. In this type of refueling, external auxiliary fuel tank 20 is coupled to the internal fuel system of aircraft 10 at fuel port 45. Fuel filling the main tanks of aircraft 10 is pumped employing the aircraft's fuel system through fuel port 45 into bladder 34. Conversely, fuel is pumped from bladder 34 to the main tanks of aircraft 10 through fuel port 45 as needed. Fuel entering or leaving bladder 34 passes through fuel port 45 and defuel valve 47.

Defuel valve 47 closes when fuel within bladder 34 is lowered to a certain point sensed by low level pilot valve 48, indicating tank 20 is empty, and preventing air from being introduced into the fuel system. High level pilot valve 40 closes defuel valve 47 when fuel within bladder 34 is raised to a certain point, indicating tank 20 is full. It will be understood that the low level and high level valves are a combination of sensors which can detect fuel levels for different purposes and close or open defuel valve 47, and other devices can be employed to achieve the same means. Fuel quantity probe 49 indicates to the pilot of the aircraft the level of fuel present. The defuel valve, the high level valves, the low level sensor, the fuel quantity probe and other devises can be suspended from either the forward or aft cover plates or can be attached to the inner walls of the bladder.

A mounting assembly is employed to securely and removably attach tank 20 to aircraft 10. In this embodiment, the mounting assembly includes mounting lugs 28 and 29 coupling tank 20 to pylon 16 of aircraft 10. Since two points carry the entire weight of tank 20 and the fuel carried therein, these points must be very strong. Furthermore, the weight supported by these points must be substantially evenly distributed to maintain proper operation of the aircraft. To achieve these properties, a center structure is employed.

In this embodiment the center structure is located inside and under the forward shell and rearward shell portions 23 and 24, with those portion substantially abutting. It will be understood that in other embodiments the center structure can include an outer shell surface. In this instance, the forward and rearward shell portions are each separately connected to the center structure without directly abutting each other. The center structure completes shell 22. Thus, while the center structure is carried by the shell and is positioned intermediate the forward and rearward shell portion in both instances, in the second instance the center structure also forms a central portion of the shell.

Figure 7:
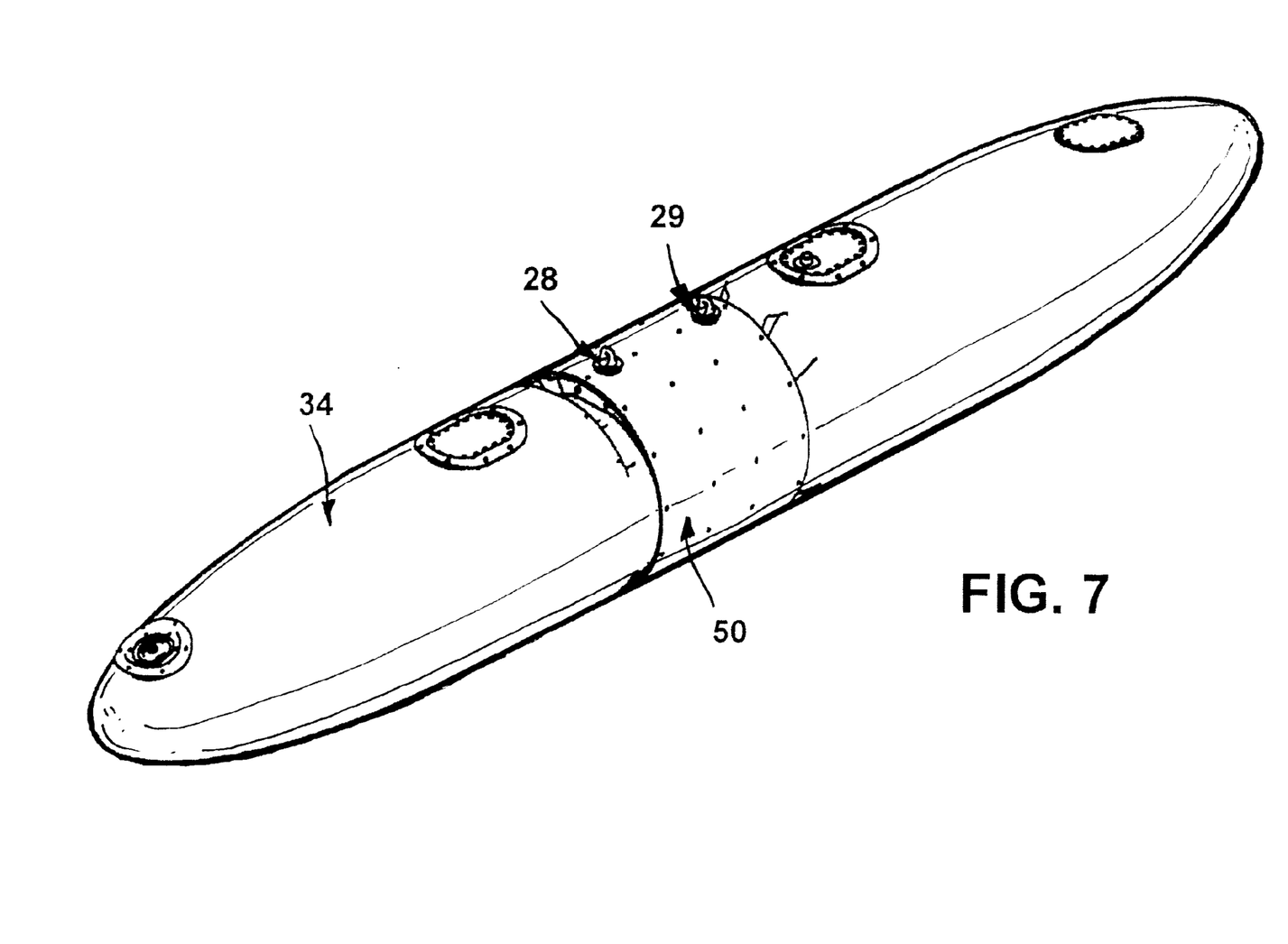
FIG. 7 is a top perspective view of a bladder and center structure.
Figure 8:
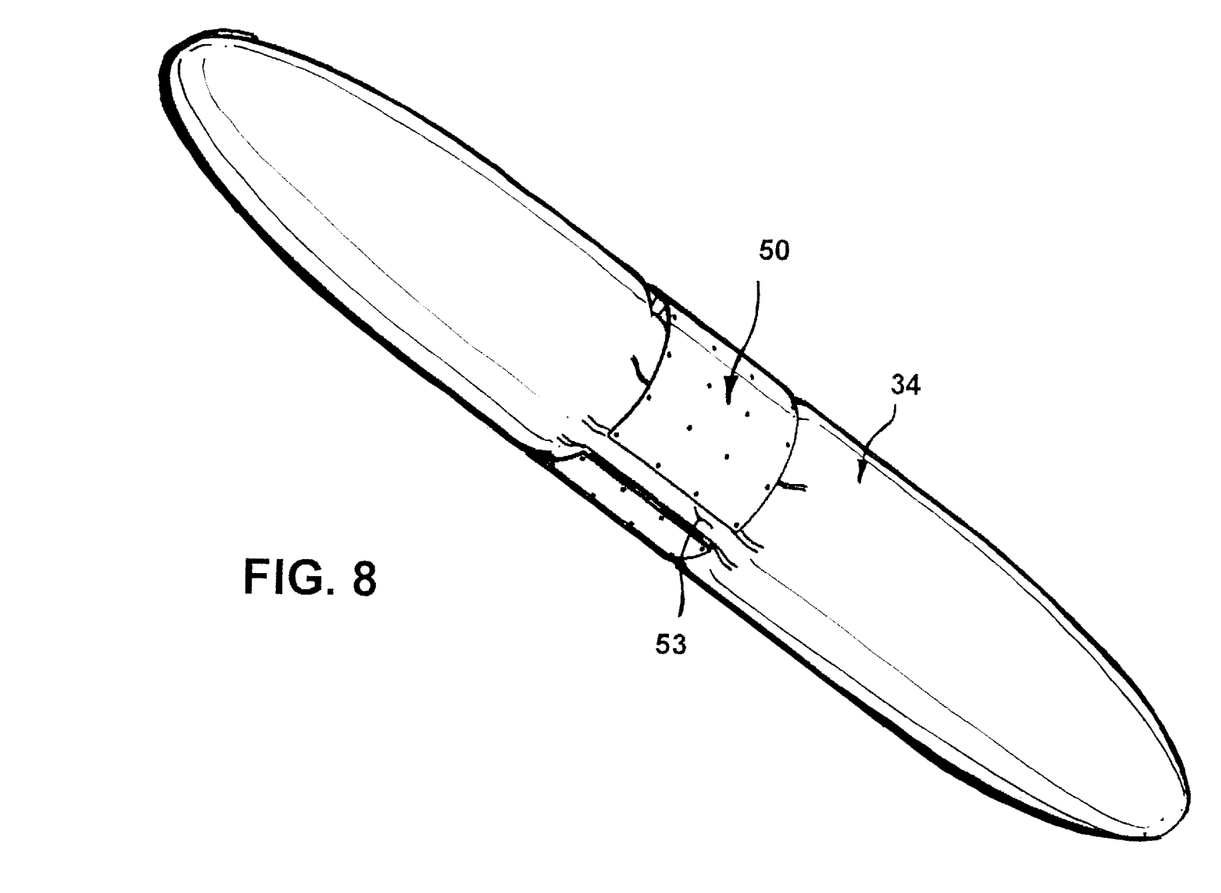
FIG. 8 is a bottom perspective view of the bladder and center structure of FIG. 7.
Figure 9:
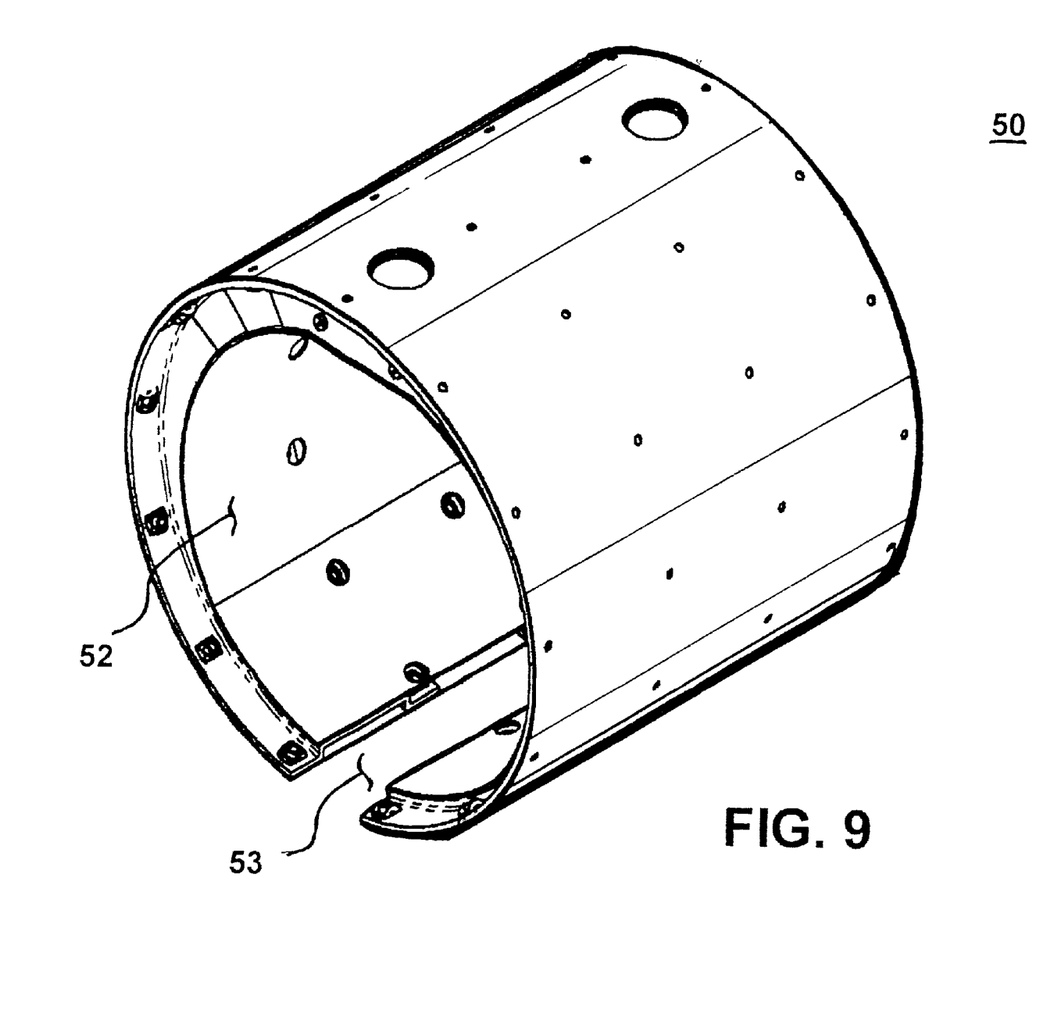
FIG. 9 is a perspective view of the center structure.
Figure 10:
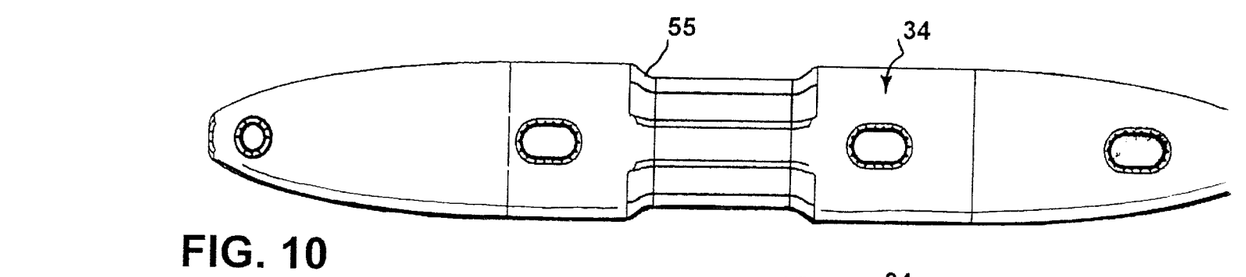
FIG. 10 is a top plan view of the bladder.
Figure 11:
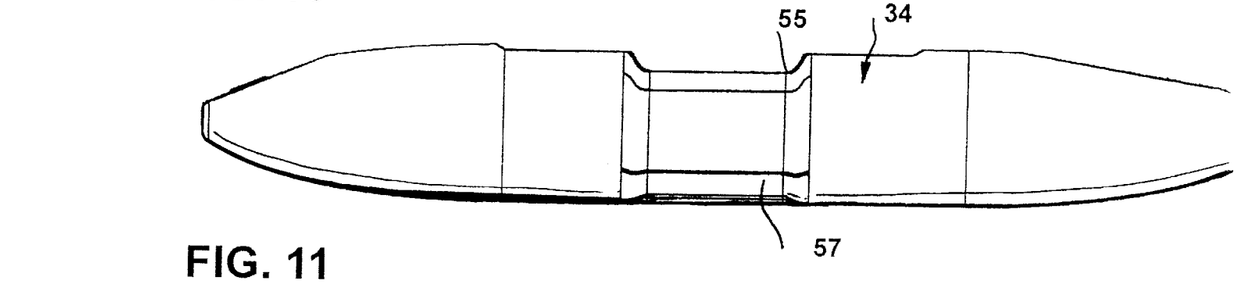
FIG. 11 is a side plan view of the bladder.
Figure 12:
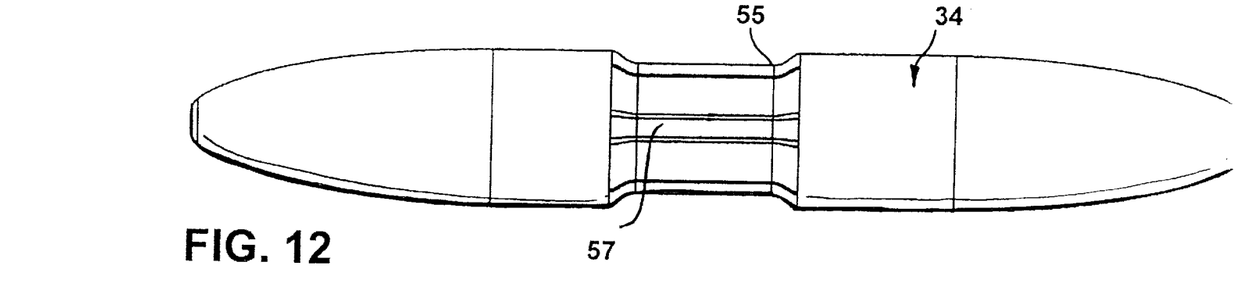
FIG. 12 is a bottom plan view of the bladder.
Figure 13:
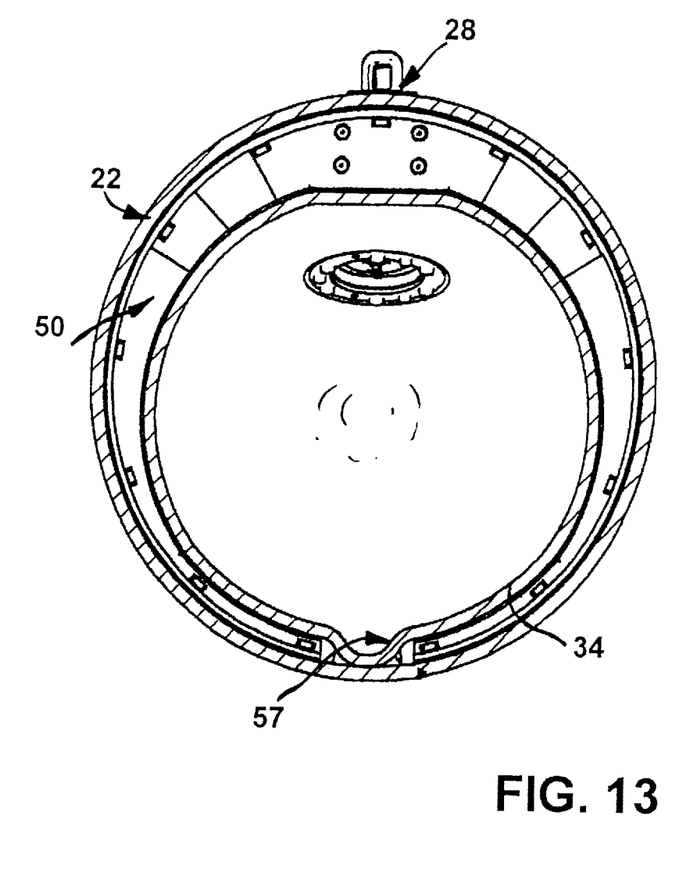
FIG. 13 is a sectional end view of the external auxiliary fuel tank taken along lines 13—13 of FIG. 2.

Turning to FIGS. 7–9 a center structure 50 is illustrated. Center structure 50 is generally tubular in shape, defining a central opening 52 and having a longitudinal gap 53 formed in a lower side thereof the purpose for which will be described presently. Mounting lugs 28 and 29 coupled directly to center structure 50. Bladder 34 passes through central opening 52 of center structure 50. Center structure 50 is coupled to an inner surface of shell 22 at midline 25, joining forward shell portion 23 and rearward shell portion 24.

With additional reference to FIGS. 10–13, bladder 34 is generally shaped to correspond to the interior of shell 22, and is thus generally tubular with tapered ends. However, to accommodate center structure 50, a central constriction 55 is provided. Central constriction 55 provides room for center structure 50 to fit within shell 22. To permit fluid communication between opposing ends of bladder 34, a trough 57 is formed through central constriction 55 in a lower portion of bladder 34. Thus, as fuel is removed through fuel port 45 located in the rearward portion of bladder 45, fuel flow is unrestricted from the forward portion to the rearward portion of bladder 34. In this manner, very little fuel will collect in the bottom of tank 20, and weight distribution will be evenly maintained. The depth of central constriction 55 depends on the materials used to build center structure 50, and the strength required.

With momentary reference to FIG. 15, large movements or sloshing of fuel along the length of tank 20 are prevented by employing baffles 60 in the bladder. Apertures can be formed in baffles 60 to permit fluid flow between ends to maintain even distribution of fuel, but prevents large, rapid movements of fuel as the orientation of the aircraft changes. Large weight variations in a fuel tank can adversely effect the operation of the aircraft.

Figure 14:
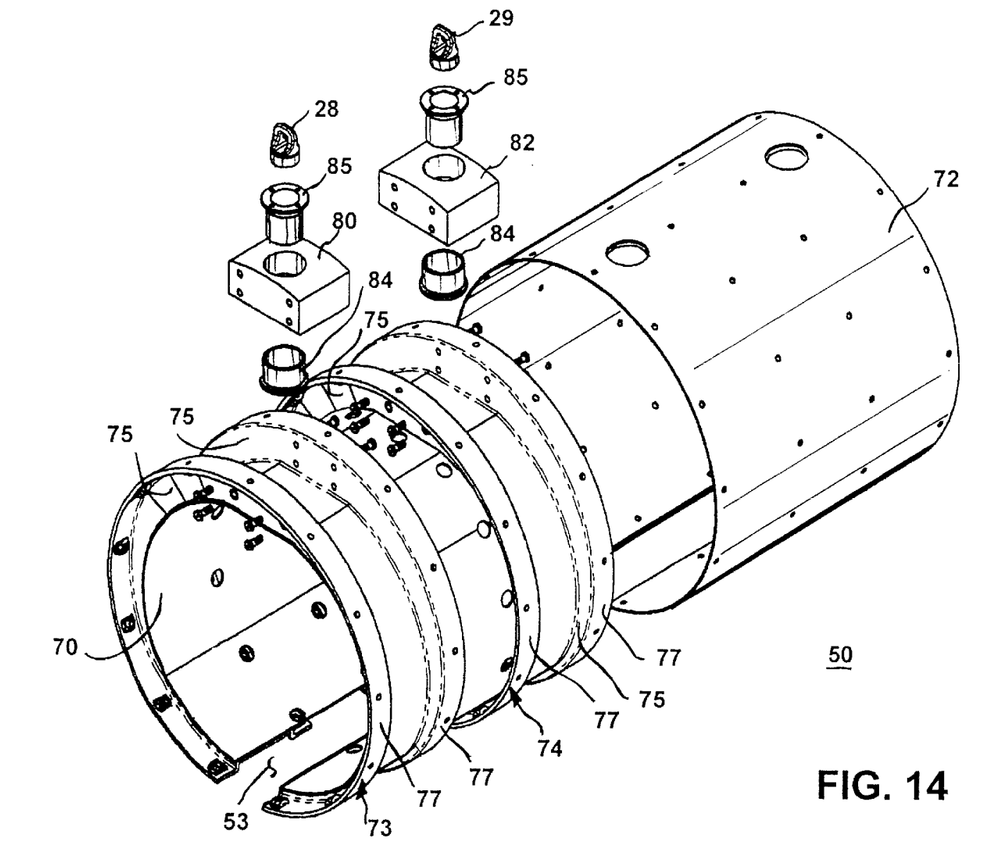
FIG. 14 is an exploded perspective view of the center structure.

Referring to FIG. 14, center structure 50 includes an inner layer 70, an outer layer 72 with a pair of frame sections 73 and 74 sandwiched there between. Frame sections 73 and 74 each have a generally U-shaped cross section, and each have a pair a parallel radially extending walls 75 terminating in longitudinally extending flanges 77. Mounting lugs 28 and 29 are anchored to center structure 50 by providing molar blocks 80 and 82 positioned between and coupled to radially extending walls 75 of sections 73 and 74, respectively. Mounting lugs 28 and 29 are threadably coupled to molar blocks 80 and 82, through apertures formed in outer layer 72, and shell 22. Molar blocks 80 and 82 are preferably formed of aluminum because of weight considerations. However, lugs 28 and 29 are steel. A threaded insert 84 and a lug bushing 85 are threaded into molar blocks 80 and 82 and are formed of steel to provide a steel to steel junction for mounting lugs 28 and 29. Inner layer 70, outer layer 72 and sections 73 and 74 are bonded together to form a single unit. Light composition materials, such as fiberglass composites, are employed giving strength and light weight to center structure 50.

Thus, an external auxiliary fuel tank is provided for use on aircraft which can generally withstand crashes that are survivable by the pilot and crew of an aircraft. The tank can also generally survive small arms fire without leaking. This permits the tank to be employed for a broad range of missions and need not be jettisoned as often as are conventional tanks.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

What is claimed is:

1. An external auxiliary fuel tank for aircraft, comprising:
 an elongated shell having a first end and a second end;
 a crashworthy bladder carried within the shell, and extending substantially from the first end to the second end;
 a center structure carried by the shell intermediate the first end and the second end, through which the bladder passes;
 the shell having a forward shell portion and a rearward shell portion, the forward shell portion and the rearward shell portion being joined by the center structure; and
 a mounting assembly carried by an upper side of the center structure for attaching the fuel tank to an aircraft.

2. An external auxiliary fuel tank as claimed in claim 1 wherein the center structure is generally tubular in shape, defines a central opening and has a longitudinal gap formed opposite the mounting assembly.

3. An external auxiliary fuel tank as claimed in claim 2 wherein the mounting assembly includes a first mounting lug coupled to the center structure and extending through the forward shell portion, and a second mounting lug coupled to the center structure and extending through the rearward shell portion.

4. An external auxiliary fuel tank as claimed in claim 2 wherein the crashworthy bladder is generally tubular with tapered ends, has a central constriction receivable within the opening of the center structure, and has a trough formed through the central constriction, receivable within the longitudinal gap, and joining ends of the bladder in fluid communication.

5. An external auxiliary fuel tank as claimed in claim 1 further including a fuel port formed in the bladder and shell for transporting fuel to and from the tank.

6. An external auxiliary fuel tank as claimed in claim 5 wherein the fuel port is couplable to the fuel system of an aircraft.

7. An external auxiliary fuel tank as claimed in claim 6 further comprising:
 a fuel flow valve having an open position and a closed position, carried within the bladder;
 a high level sensor for determining a high level of fuel within the bladder and a low level sensor for determining a low level of fuel within the bladder, the high level sensor moving the fuel flow valve to the closed position when in coming fuel reaches the high level, and the low level sensor moving the fuel flow valve to the closed position when outgoing fuel reaches the low level.

8. An external auxiliary fuel tank as claimed in claim 1 further comprising:
 a gravity fill port including an aperture in the shell coupled to a corresponding aperture in the bladder; and
 a fuel cap removably coupled to the aperture in the shell to allow fuel to be pumped into the bladder.

9. An external auxiliary fuel tank as claimed in claim 1 further comprising a vent valve for venting gasses from the bladder when adding or removing fuel.

10. An external auxiliary fuel tank as claimed in claim 1 further comprising a plurality of baffles carried within the bladder to prevent movement of large volumes of fuel.

11. An external auxiliary fuel tank for aircraft, comprising:
 an elongated shell having a forward shell portion, a rearward shell portion, and an upper side;
 a center structure being generally tubular in shape, defining a central opening and having a longitudinal gap formed opposite an upper side thereof, joins the forward shell portion to the rearward shell portion;
 a crashworthy bladder having a first end, a second end, and an upper side, carried within the shell, and extending between the forward shell portion and the rearward shell portion through the central opening of the center structure, with the upper side of the bladder adjacent the upper side of the shell; and
 mounting assembly carried by an upper side of the center structure for attaching the fuel tank to an aircraft.

12. An external auxiliary fuel tank as claimed in claim 11 wherein the crashworthy bladder is generally tubular with tapered ends, has a central constriction receivable within the central opening of the center structure, and has a trough formed through the central constriction opposite the upper surface of the bladder and received in the longitudinal gap, the trough joining the first end and the second end of the bladder in fluid communication.

13. An external auxiliary fuel tank as claimed in claim 12 wherein the mounting assembly includes a first mounting lug coupled to the upper side of the center structure and extending through the forward shell portion, and a second mounting lug coupled to the upper side of the center structure and extending through the rearward shell portion.

14. An external auxiliary fuel tank as claimed in claim 12 further including a fuel port formed in the bladder and the shell for transporting fuel to and from the tank.

15. An external auxiliary fuel tank as claimed in claim 14 wherein the fuel port is couplable to the fuel system of an aircraft.

16. An external auxiliary fuel tank as claimed in claim 15 further comprising:
   a fuel flow valve having an open position and a closed position, carried within the bladder;
   a high level sensor for determining a high level of fuel within the bladder and a low level sensor for determining a low level of fuel within the bladder, the high level sensor moving the fuel flow valve to the closed position when in coming fuel reaches the high level, and the low level sensor moving the fuel flow valve to the closed position when outgoing fuel reaches the low level.

17. An external auxiliary fuel tank as claimed in claim 12 further comprising:
   a gravity fill port including an aperture in the shell coupled to a corresponding aperture in the bladder; and
   a fuel cap removably coupled to the aperture in the shell to allow fuel to be pumped into the bladder.

18. An external auxiliary fuel tank as claimed in claim 12 further comprising a vent valve for venting gasses from the bladder when adding or removing fuel.

19. An external auxiliary fuel tank as claimed in claim 12 further comprising a plurality of baffles carried within the bladder to prevent movement of large volumes of fuel.

20. An external auxiliary fuel tank for use on an aircraft, comprising:
   an elongated shell having a first end and a second end;
   a center structure being generally tubular in shape, defining a central opening and having a longitudinal gap formed opposite an upper side thereof, is carried by the shell intermediate the first end and the second end;
   a crashworthy bladder carried within the shell and extending through the central opening of the center structure from the first end of the shell to the second end of the shell, the crashworthy bladder is generally tubular with tapered ends, has a central constriction receivable within the central opening of the center structure, and has a trough formed through the central constriction and received in the longitudinal gap;
   a mounting assembly carried by the center structure for attaching the fuel tank to an aircraft.

21. An external auxiliary fuel tank as claimed in claim 20 wherein the shell includes a forward shell portion and a rearward shell portion, the forward shell portion and the rearward shell portion are joined by the center structure.

22. An external auxiliary fuel tank as claimed in claim 21 wherein the mounting assembly includes a first mounting lug coupled to the center and extending through the forward shell portion, and a second mounting lug coupled to the center structure and extending through the rearward shell portion.

23. An external auxiliary fuel tank removably coupled to a pylon on the wing of an aircraft having a fuel system, comprising:
   an elongated shell having a first end and a second end;
   a center structure being generally tubular in shape, defining a central opening and having a longitudinal gap formed opposite an upper side thereof, is carried by the shell intermediate the first end and the second end;
   a crashworthy bladder carried within the shell and extending through the central opening of the center structure from the first end of the shell to the second end of the shell, the crashworthy bladder is generally tubular with tapered ends, has a central constriction receivable within the central opening of the center structure, and has a trough formed through the central constriction and received in the longitudinal gap;
   a mounting assembly carried by the center structure, removably attaching the fuel tank to the pylon of the aircraft.

24. An external auxiliary fuel tank as claimed in claim 23 wherein the shell includes a forward shell portion and a rearward shell portion, the forward shell portion and the rearward shell portion are coupled by the center structure.

25. An external auxiliary fuel tank as claimed in claim 24 wherein the mounting assembly includes a first mounting lug coupled to the center structure and extending through the forward shell portion, and a second mounting lug coupled to the center structure and extending through the rearward shell portion.

26. An external auxiliary fuel tank as claimed in claim 23 further including a fuel port formed in the bladder and shell for transporting fuel to and from the tank.

27. An external auxiliary fuel tank as claimed in claim 23 wherein the fuel port is coupled to the fuel system of the aircraft.

* * * * *